3,314,760
METHANE CONVERSION PROCESS
Louis E. Trapasso, Maple Heights, Ohio, assignor to The
B. F. Goodrich Company, New York, N.Y., a corporation of New York
No Drawing. Filed Sept. 27, 1962, Ser. No. 226,722
The portion of the term of the patent subsequent to
Mar. 16, 1982, has been disclaimed
8 Claims. (Cl. 23—204)

This invention relates to the conversion of methane to chlorinated methanes and carbon monoxide by the oxychlorination reaction using a novel catalyst. More particularly, the conversion of methane by the catalytic process embodied herein gives a product consisting of major proportions of methyl chloride and carbon monoxide, minor proportions of methylene chloride, chloroform, and carbon dioxide, and insignificant amounts of carbon tetrachloride. The catalyst is an iron phosphate used alone or in combination with a phosphate of another metal.

The term "oxychlorination" is used herein as elsewhere in the art to refer to a reaction in which the source of chlorine employed for the chlorination reaction is gaseous hydrogen chloride which is made to give up its chlorine in useful forms when contacted with oxygen. Thus it is well known to react methane with hydrogen chloride in the presence of a catalytic agent and oxygen, or an oxygen containing gas, according to the reaction

$$CH_4 + xHCl + \frac{x}{2}O_2 \longrightarrow CH_{4-x}Cl_x + xH_2O$$

wherein $x$ stands for any integer from 1 to 4.

The widely used Deacon Process for oxychlorination of methane employs copper salt catalysts, e.g., copper oxides, copper chlorides, copper silicate, and the like. One disadvantage of the Deacon Process is the relatively rapid rate at which the catalyst loses its effectiveness, thus requiring frequent replacement and regeneration. This drawback is especially encountered when operating at high oxychlorination temperatures where the catalysts are most efficient with respect to conversion of the hydrocarbon.

The present process comprises contacting a mixture of methane, hydrogen chloride, and oxygen or an oxygen containing gas, preferably air, with an iron phosphate catalyst in a reaction zone at elevated temperatures, i.e., about 300 to 700° C., thereby converting a portion of the methane feed stock to chlorinated methane derivatives and carbon monoxide. The iron phosphate maintains its catalytic action over long periods of time.

It is essential that the catalyst employed in the present invention be a phosphate salt of iron. Phosphate salts of other metals, especially those of copper, cobalt, nickel, chromium, lead, cerium, manganese, bismuth, magnesium, cadmium, and vanadium, can be used in conjunction with the iron phosphate. These additional phosphate salts serve as promoters or activators when used in conjunction with the iron phosphate in spite of the fact that they show little or no activity when used alone. Stated differently, the catalyst for the instant process is a phosphate of iron, either alone or combined with a phosphate of one or more of the other aforementioned metals, the additional salt functioning as a promoter. The mole ratio of the phosphate of iron to the phosphate of said other metal, when so combined in the catalyst, is at least 1:1, and preferably from 1:1 to 5:1; however, it is obvious from the preceding discussion that this ratio has no upper limit.

The phosphate moiety of the catalyst salt is an anion containing only phosphorus and oxygen such as the orthophosphates, the polyphosphates, metaphosphates, ultraphosphates, pyrophosphates, monohydrogen phosphates, dihydrogen phosphates and others of the types discussed in the "Encyclopedia of Chemical Technology" by Kirk and Othmer, 1954, volume 10, pages 403–435. Most preferred are the pyrophosphates.

In cases of phosphates wherein the metal moiety is bivalent or tervalent, the salt will normally be used in its most stable form, although some salt of the less stable valency may be present. For instance, ferric pyrophosphate is predominant over ferrous pyrophosphate, cobaltous pyrophosphate prevails over cobaltic pyrophosphate, the cupric phosphate over the cuprous salt, etc.

Although the catalyst embodied herein may be used, per se, in any convenient physical form, it is desirable that the catalyst be deposited on or combined with an inert carrier, preferably of small particle size, e.g., from about 8 to 325 mesh (Tyler Screen Scale Designation). Suitable carriers for impregnation with the catalysts include diatomaceous earths, silica, silica gel, pumice, alumina, clay, porous brick, and the like. The preferred support in the instant process is silica. The catalytic metal phosphates should be at least about 0.5 weight percent of the total combined weight of the catalyst and inert carrier. The preferred supported catalysts are comprised of from about 5 to 25 weight percent of the metal phosphates and from about 75 to 95 weight percent of the inert carrier. The oxychlorination reaction may be carried out with the catalyst in either a fixed state or in a fluidized state, both methods of operation being well known to those skilled in the art. For fixed bed operation the preferred average particle size of the catalyst is from about 8 to about 32 mesh; for fluidized bed processing from about 200 to about 325 mesh particles are preferred.

In the present process the mole ratio of methane to hydrogen chloride in the feed gas to the reaction (catalyst) zone is from about 1:0.2 to about 1:5 with the more preferred range being from about 1:0.6 to about 1:2. The molar ratio of methane to oxygen can range from about 1:0.1 to 1:1, with a preferred ratio of 1:0.4 to 1:0.7. The ratios of the feed gases may be subjected to considerable variation without seriously interfering with the process; however, use of the preferred higher ratios of methane to hydrogen chloride and oxygen as set forth above produces more methyl chloride and relatively less carbon oxides.

The space velocity of the feed gases entering the reaction zone is expressed as the volume of feed gas per volume of catalyst per hour, wherein "catalyst" refers to the phosphate agents plus the inert carrier when a carrier is used. Space velocities of from 200 to 1000 can be employed, however, a space velocity of from about 300 to about 600 is preferred. Stated differently, residence times for the gases in the reaction zone are preferably from about 6 to 12 seconds, with from 3.5 to 18 seconds being operable without the extended periods causing detrimental effects. The temperature in the reaction zone can vary within the range of 300° to 700° C., but for best yields of the more desired methyl chloride product from about 550° to 650° C. is preferred.

In practicing this invention in the described manner, methane conversions of from 25 to 70% are usually obtained. The product gases, that is, the stream leaving the catalytic zone, excluding unreacted methane, generally contain from about 25 to 60 mole percent of methyl chloride and from about 30 to about 70 mole percent of carbon monoxide, and also small amounts of carbon dioxide and more highly chlorinated methanes. The product gases can be separated into the individual components and purified by conventional fractional distillation techniques. Methyl chloride is extensively used in industry as a refrigerant, as one of the starting materials in the synthesis of silicone rubber, in the synthesis of of an anti-knock additive for gasoline, and as an intermediate in the production of many other products. Carbon monoxide is employed in the preparation of metal carbonyls, the useful intermediate, phosgene, and in many organic syntheses.

*Examples I and II*

A ferric-cobaltous pyrophosphate catalyst was prepared by the following procedure. 4.26 grams (0.03 mole) of anhydrous ferric chloride, 2.38 grams (0.01 mole) of cobaltous chloride ($CoCl_2 \cdot 6H_2O$), and 5.75 grams (0.05 mole) of 85% orthophosphoric acid were dissolved in a liter of water. 30 cc. of concentrated hydrochloric acid were added to prevent precipitation of the insoluble phosphates formed by the reaction of the salts with the phosphoric acid. 68 grams of silica gel (about 8 to 16 mesh) were added to the stirred solution. The mixture was then taken to dryness while applying a vacuum thereto using a hot water bath as the heating means. The dried material, a mixture of ferric and cobaltous phosphates (a 3:1 molar ratio of iron to cobalt salt) deposited on the finely divided, inert silica carrier, was employed as the catalyst in the oxychlorination of methane as next described.

The following physical set-up was used in the oxychlorination operations. The feed gases were fed from cylinders under a pressure of about 5 p.s.i.g. Their flow rates were measured and controlled by means of Fischer and Porter Tri-Flat variable area flowmeters equipped with regulating needle valves. All of the gases used were passed through granular anhydrous calcium sulfate drying towers and medium porosity sintered glass filters before they entered the flowmeters. The metered gases passed into a manifold fitted with polytetrafluoroethylene stopcocks, and entered the top of a vertical reaction tube through an adaptor. The adaptor was fitted with a thermocouple well which extended to the bottom of the reaction tube allowing the thermocouple to reach any point in the reaction tube. The reaction tube was a straight Vycor glass tube 0.63 inch in diameter and about 12 inches long with about 60 ml. capacity. The reaction tube was covered on its exterior with two layers of asbestos-covered Nichrome wire. During the reaction the inner wire had a continuous application of electric current to hold the reaction temperature at the desired level. The outer wire was energized electrically by a controlling pyrometer which was activated by the thermocouple. The reaction tube was packed with 50 ml. of catalyst prior to the reaction.

The bottom of the reaction tube was fitted with an adaptor having a side arm equipped with a stopcock and a small trap (25 ml. capacity) adapted to catch and hold liquids coming from the reaction tube. The exit gases were led off through the side arm and through a gas dispersion tube immersed about 12 inches in a water tower. The dispersed gas bubbled up through the water and the resulting exit gases were analyzed by gas chromatography in a Perkin-Elmer, Model 154 gas chromatography instrument. The gases were analyzed on three types of columns: (1) molecular sieves, (2) silica gel and (3) tricresyl phosphate on a Fischer Column Pack.

The data and results pertinent to the two runs are tabulated below:

| | Example I | Example II |
|---|---|---|
| Mole Ratio of Methane:HCl:$O_2$ in Feed Gas Mixture | 1.0:0.67:0.33 | 1.0:0.4:0.2 |
| Space Velocity [1] | 576 | 576 |
| Reaction Temp., °C | 590 | 590 |
| Methane Conv., percent | 66.4 | 30.3 |
| Product Analysis, Mole percent: | | |
| $CH_3Cl$ | 20.6 | 52.2 |
| $CH_2Cl_2$ | 0.2 | 2.4 |
| $CHCl_3$ | 1.4 | 2.8 |
| CO | 73.5 | 36.6 |
| $CO_2$ | 4.3 | 6.0 |

[1] Volume of feed gas per volume of catalyst per hour.

*Examples III, IV and V*

A ferric-ceric phosphate catalyst was prepared by first dissolving and reacting 2.0 grams (0.01 mole) of ceric hydroxide, 6.4 grams (0.04 mole) of ferric chloride, and 7.0 grams (0.06 mole) of 85% orthophosphoric acid in 50 cc. of concentrated hydrochloric acid. 68 grams of silica gel (8 to 16 mesh) were added with stirring, and the water then driven from the mixture by heating under vacuum. The catalyst, a mixture of ferric and ceric pyrophosphates (a 4:1 molar ratio of iron to cerium salt) was thereby recovered as a deposit on the finely divided silica support.

Three oxychlorination runs were made using the procedure set forth in Examples I and II and the catalyst as prepared above. The data are presented below.

| | Example III | Example IV | Example V |
|---|---|---|---|
| Mole Ratio of $CH_4$:HCl:$O_2$ in Feed Gas | 1.0:0.4:0.2 | 1.0:3.0:1.0 | 1.0:4.0:1.0 |
| Space Velocity | 576 | 578 | 696 |
| Reaction Temp., °C | 590 | 600 | 600 |
| Methane Conv., percent | 31.3 | 43.8 | 38.0 |
| Product Analysis, mole percent: | | | |
| $CH_3Cl$ | 45.2 | 21.6 | 34.3 |
| $CH_2Cl_2$ | 2.1 | 2.9 | 4.6 |
| $CHCl_3$ | 5.0 | 0 | 0 |
| CO | 40.9 | 53.4 | 45.2 |
| $CO_2$ | 6.8 | 22.1 | 15.9 |

*Example VI*

3.8 grams (0.022 mole) of cupric chloride ($CuCl_2 \cdot 2H_2O$)

6.0 grams (0.022 mole) of ferric chloride ($FeCl_3 \cdot 6H_2O$), and 6.4 grams (0.055 mole) of 85% $H_3PO_4$ were placed in an evaporating dish with 533.3 grams of an aqueous colloidal sol containing approximately 30% $SiO_2$. The mixture was evaporated to dryness, dried in a vacuum oven, and heated in a 540° C. furnace for about 16 hours. The resulting dry chunks were broken up, pulverized, and sieved to give particles within the range of 9 to 28 mesh comprising a ferric pyrophosphate-cupric pyrophosphate mixture in a 1:1 molar ratio deposited on a silica carrier. This catalyst was used in a methane oxychlorination with these results:

| | |
|---|---|
| Mole ratio of $CH_4$:HCl:$O_2$ in feed gas | 1.0:0.67:0.33 |
| Space velocity | 576 |
| Reaction temp., °C | 550 |
| Methane conv., percent | 35.7 |
| Product analysis, mole percent: | |
| $CH_3Cl$ | 57.1 |
| $CH_2Cl_2$ | 1.4 |
| CO | 35.4 |
| $CO_2$ | 6.1 |

*Example VII*

1.35 grams (0.005 mole) of ferric chloride ($FeCl_3 \cdot 6H_2O$)

0.67 gram (0.005 mole) of cupric chloride, and 2.3 grams (0.02 mole) of 85% $H_3PO_4$ were dissolved in 50 cc. of water. 13 grams of finely divided pumice stone (16 mesh) were added and the mixture was taken to dryness on a hot plate. The catalyst, a ferric-cupric (mole ratio=1:1) pyrophosphate combination on pumice carrier, was employed in a methane oxychlorination with the following results:

| | |
|---|---|
| Mole ratio of $CH_4$:HCl:$O_2$ in feed gas | 1.0:0.67:0.33 |
| Space velocity | 576 |
| Reaction temp., °C | 600 |
| Methane conv., percent | 26.1 |

Product analysis, mole percent:

| | |
|---|---|
| $CH_3Cl$ | 54.9 |
| $CH_2Cl_2$ | 4.0 |
| $CHCl_3$ | 0.8 |
| $CO$ | 35.5 |
| $CO_2$ | 4.8 |

While the invention has been described with reference to certain specific examples, it is not intended that these be taken as limitations on the scope of the invention. For instance, an oxygen containing gas can be employed in lieu of comparatively pure or undiluted oxygen with good results, provided that the relative feed rate thereof is adjusted to give the aforementioned ratios of the feed gases, and also provided that the diluent gas is inert to the reaction. Such oxygen containing gases adaptable to the process include air and mixtures of oxygen with nitrogen, argon, neon, and the like. Air is particularly suitable for supplying elemental oxygen to the process since it is most easily obtained and inexpensive. It is also understood that the methods for preparing the catalysts embodied herein are not critical to the process.

I claim:

1. The method of preparing methyl chloride and carbon monoxide which comprises contacting in a reaction zone at a temperature of from about 300° to 700° C. a gaseous mixture of methane, hydrogen chloride, and oxygen in a molar ratio of methane to hydrogen chloride from about 1:0.2 to about 1:5 and methane to oxygen from about 1:0.1 to 1:1 with a cataylst comprising a phosphate salt of iron.

2. The method according to claim 1 wherein in said gaseous mixture the mole ratio of methane to hydrogen chloride is from about 1:0.6 to about 1:2 and the mole ratio of methane to oxygen is from about 1:0.4 to about 1:0.7, the catalyst is a phosphate salt of iron deposited on a finely-divided inert carrier, and the space velocity of the gaseous mixture in the reaction zone is from 200 to 1000.

3. The method of claim 2 wherein the catalyst is ferric pyrophosphate.

4. The method of preparing methyl chloride and carbon monoxide which comprises contacting in a reaction zone at a temperature of from about 300° to 700° C. a gaseous mixture of methane, hydrogen chloride, and oxygen in a molar ratio of methane to hydrogen chloride from about 1:0.2 to about 1:5 and methane to oxygen from about 1:0.1 to 1:1 with a catalyst comprising a phosphate salt of iron in conjunction with a phosphate salt of one or more other metals selected from the group consisting of copper, cobalt, nickel, chromium, lead, cerium, manganese, bismuth, magnesium, cadmium and vanadium, the molar ratio of the phosphate of iron to the phosphate of said other metal or metals being at least 1:1.

5. The method according to claim 4 wherein in said gaseous mixture the mole ratio of methane to hydrogen chloride is from about 1:0.6 to about 1:2 and the mole ratio of methane to oxygen is from about 1:0.4 to about 1:0.7, the catalyst is deposited on a finely-divided inert carrier, and the space velocity of the gaseous mixture in the reaction zone is from 200 to 1000.

6. The method according to claim 5 wherein the catalyst is a mixture of ferric pyrophosphate and cobaltous pyrophosphate deposited on a finely-divided inert carrier.

7. The method according to claim 5 wherein the catalyst is a mixture of ferric pyrophosphate and ceric pyrophosphate deposited on a finely-divided inert carrier.

8. The method of claim 5 wherein the catalyst is a mixture of ferric pyrophosphate and cupric pyrophosphate deposited on a finely-divided inert carrier.

References Cited by the Examiner

UNITED STATES PATENTS

| | | | |
|---|---|---|---|
| 2,952,714 | 9/1960 | Milan et al. | 260—662 |
| 3,173,962 | 3/1965 | Carroll et al. | 260—659 |

OSCAR R. VERTIZ, *Primary Examiner.*

MAURICE A. BRINDISI, *Examiner.*

R. M. DAVIDSON, M. WEISSMAN,
*Assistant Examiners.*